(12) United States Patent
Shu et al.

(10) Patent No.: US 9,394,641 B2
(45) Date of Patent: Jul. 19, 2016

(54) WASHING MACHINE UTILIZING UNIFORM WASHING FORCE AND WASHING METHOD THEREOF

(75) Inventors: Hai Shu, Qingdao (CN); Peishi Lv, Qingdao (CN); Sheng Xu, Qingdao (CN); Lin Yang, Qingdao (CN); Baozhen Cheng, Qingdao (CN); Qiuying Gao, Qingdao (CN)

(73) Assignees: HAIER GROUP CORPORATION, Laoshan, Qingdao, Shandong (CN); QINGDAO HAIER WASHING MACHINE CO., LTD., Laoshan, Qingdao, Shandong (CN)

( * ) Notice: Subject to any disclaimer, the term of this patent is extended or adjusted under 35 U.S.C. 154(b) by 335 days.

(21) Appl. No.: 13/996,550

(22) PCT Filed: Jun. 23, 2011

(86) PCT No.: PCT/CN2011/076219
§ 371 (c)(1),
(2), (4) Date: Sep. 10, 2013

(87) PCT Pub. No.: WO2012/083661
PCT Pub. Date: Jun. 28, 2012

(65) Prior Publication Data
US 2013/0340180 A1    Dec. 26, 2013

(30) Foreign Application Priority Data

Dec. 23, 2010  (CN) .......................... 2010 1 0601603
Dec. 23, 2010  (CN) .......................... 2010 1 0601605
Dec. 23, 2010  (CN) .......................... 2010 1 0601606

(51) Int. Cl.
*D06F 17/10*  (2006.01)
*D06F 23/04*  (2006.01)
(Continued)

(52) U.S. Cl.
CPC ................ *D06F 17/10* (2013.01); *D06F 23/04* (2013.01); *D06F 35/006* (2013.01); *D06F 37/14* (2013.01); *Y02B 40/56* (2013.01)

(58) Field of Classification Search
None
See application file for complete search history.

(56) References Cited

U.S. PATENT DOCUMENTS 2,158,815 A * 5/1939 Bendix ........................... 68/184
4,321,809 A * 3/1982 Bochan ........................... 68/207
(Continued)

FOREIGN PATENT DOCUMENTS

CN    101008141 A     8/2007
CN    101851835 A     10/2010
(Continued)

OTHER PUBLICATIONS

International Search Report (PCT/ISA/210) issued on Oct. 13, 2011, by the Chinese Patent Office as the International Searching Authority for International Application No. PCT/CN2011/076219.

*Primary Examiner* — Michael Barr
*Assistant Examiner* — Cristi Tate-Sims
(74) *Attorney, Agent, or Firm* — Buchanan Ingersoll & Rooney PC

(57) ABSTRACT

A washing machine includes an inner tub arranged in an outer tub and a rotatable wave wheel. As every 1 kg load is increased, the height difference $h_1$ between the clothes and water satisfies the formula $h_1=(\pi D^2 h - 4V_1)/(K\pi D^2)$, wherein D is the diameter of the inner tub, h is the height of the wave wheel, $V_1$ is the volume of the wave wheel, and K is the optimal clothes load between the wave wheel and the inner tub within the wave wheel height. The clothes overturn periodically while rotating along with the wave wheel. The clothes move towards the center of the wave wheel along the wave wheel while moving upward, overturn outwards in a uniform wobble way after reaching the climax of the wave wheel and fall to the bottom of the inner tub along the inner tub wall, and move towards the center of the wave wheel again.

13 Claims, 7 Drawing Sheets

(51) Int. Cl.
   *D06F 35/00* (2006.01)
   *D06F 37/14* (2006.01)

(56) References Cited

U.S. PATENT DOCUMENTS

| | | | |
|---|---|---|---|
| 4,651,542 A * | 3/1987 | Kohsaka | 68/23 R |
| 5,839,300 A * | 11/1998 | Yoon et al. | 68/134 |
| 2003/0200774 A1 | 10/2003 | Kim et al. | |
| 2007/0101772 A1 * | 5/2007 | Duncan et al. | 68/3 R |
| 2007/0137260 A1 * | 6/2007 | Shikamori et al. | 68/3 R |
| 2011/0107799 A1 | 5/2011 | Duncan et al. | |
| 2012/0017647 A1 | 1/2012 | Duncan et al. | |
| 2012/0227189 A1 | 9/2012 | Duncan et al. | |

FOREIGN PATENT DOCUMENTS

| | | |
|---|---|---|
| CN | 101886317 A | 11/2010 |
| EP | 1354996 A2 | 10/2003 |
| JP | 63-302889 A | 12/1988 |
| JP | 2001-113083 A | 4/2001 |

* cited by examiner

WASHING MACHINE UTILIZING UNIFORM WASHING FORCE AND WASHING METHOD THEREOF

FIELD OF THE INVENTION

The present invention relates to a washing machine, in particular to a washing machine utilizing a uniform washing force which changes the overturning ways of the clothes and the washing method thereof.

BACKGROUND OF THE INVENTION

At present, the washing method of wave wheel washing machines is following: the washings is overturned by special water flow formed by the rotating wave wheel or the wave wheel and an inner tub rotating simultaneously, and during overturning, the washings is subject to forces and repeatedly overturns to achieve the cleaning purpose by frictional forces of the washings itself, or the washings with the wave wheel and the inner tub wall. The wave wheel of wave wheel washing machines varies in shapes, including dish-shaped, bar-shaped and bowl-shaped wave wheels. Whatever shapes the wave wheels have, they are to improve the cleaning efficiency and reduce the entanglement of clothes. However, the high cleaning efficiency and low tangling degree are contradictory to each other. A high cleaning efficiency is always accompanied by a high tangling degree, while a low tangling degree of clothes will lead to a low cleaning efficiency. The existing wave wheel washing machine has the characteristics of large consumption of water and detergent, long washing time and easy tangling of clothes. As a result, the clothes can't be uniformly washed and are easy to deform; or, the washings are washed under the impact force of water flow formed by a centrifugal force of the rotating inner tub, in which the clothes are generally washed as a whole. Though the water flow takes a washing effect, it is not enough to separate the clothes, thus the washings is tangled as a whole.

To improve the cleaning efficiency, the wave wheel is required to rotate at a big angle and a rapid speed during washing, and the water flow formed by a centrifugal force of the rotating wave wheel drives the washings to move along a direction, but this will finally make the clothes tangled together. As a result, the clothes, especially the fancy clothes, are easy to damage due to being torn. Moreover, the clothes overturn only under the action of water flow, resulting in a single and fixed moving mode and a low overturning efficiency of clothes in the inner tub, therefore, the clothes are needed to be washed several times to achieve the desired washing effect.

In addition, when this washing machine operates, the wave wheel revolves or swings, forming annular water flows. As the clothes in the washing tub move based on fluid motion or hydrodynamic force, the automatic washing machine with a wave wheel at the bottom must be filled with washing liquid for the purpose of achieving the desired annular overturning mode. The height of the washing liquid in the washing tub must be sufficient to completely soak the fabrics in the washing tub, giving rise to a large consumption of water. Moreover, the large water volume requires a large amount of detergent to achieve the sufficient detergent concentration, resulting in high washing costs and certain pollution to water resource.

In view of the foregoing, the present invention is disclosed.

SUMMARY OF THE INVENTION

A primary objective of the present invention is to overcome the disadvantages of the prior art, and provide a washing machine utilizing a uniform washing force which drives the clothes to overturn at a uniform speed, reduce tangling of the clothes and improve the cleaning efficiency and evenness of washing.

Another objective of the present invention is to provide a washing method of the washing machine utilizing a uniform washing force.

To solve the aforesaid technical problems, the basic idea of the technical scheme adopted by the present invention is as follows: a washing machine utilizing a uniform washing force comprises an outer tub for containing water, an inner tub arranged in the outer tub for containing clothes, a rotatable wave wheel and a drive device for controlling the rotation of the inner tub and the wave wheel.

The wave wheel is of a disc-shaped structure gradually rising up towards the center from its edge, on which a projection for guiding the clothes to its center is arranged, so that the clothes move upwards on the wave wheel center along the projection, and the projection is arranged outwards from the wave wheel center in echelon, the descending from one echelon to its next one being realized in a way that the circular arcs are tangent to each other, and the projection is gradually widened from the center to the edge and from the top surface to the bottom;

The circumferential wall of the inner tub is provided with a plurality of ring-shaped inward profiled structures, to increase the friction area when the clothes fall down along the inner tub wall, and outward flangings and dewatering holes are annularly and evenly arranged between two ring-shaped profiled structures;

A plurality of bumps for changing the motion trails of the clothes are evenly arranged at the junction of the bottom and the circumferential wall of the inner tub;

The inner wall and the wave wheel of the washing machine satisfy the following conditions: water added into the washing machine soak the clothes and enable the clothes to float while still keeping in touch with the upper surface of the wave wheel; as every 1 kg load is increased, the increased height difference $h_1$ of the clothes mixing with water satisfies the formula below to ensure that the clothes are in contact with the wave wheel while floating, and the formula is $h_1=(\pi D^2 h - 4V_1)/(K\pi D^2)$, wherein D is the diameter of the inner tub, h is the height of the wave wheel, $V_1$ is the volume of the wave wheel, and K is the optimal clothes load between the wave wheel and the inner tub within the scope of the wave wheel height.

The profiled structure of the inner tub increases the friction area while reducing the falling time of the clothes. Moreover, it comparatively increases the path of circular overturning, leaving time for loosing the clothes, and thereby reducing the possibility that the clothes pile up along the circumferential wall at the tub wall bottom, avoiding tangling of the clothes and better realizing the complete overturning of the clothes.

The profile formed by the two sides of the projection at the surface of the wave wheel is of a "八"-shaped structure extending radially and consisting of a plurality of continuous circular curves tangent to each other, the two sides of the projection are slopes transiting smoothly from the surface of the wave wheel, and the inclined angle between the slope and the surface of the wave wheel is from 90° to 120°, wherein, the inclined angle of the section ¼ to ⅔ of the length of the projection from the wave wheel center is from 110° to 120°.

The height of the projections is 1/10-⅕ of the diameter of the wave wheel, and the projections occupy ⅕-½ of the total area of the wave wheel.

The wave wheel surface between two projections is provided with a plurality of through holes which are arranged evenly radially and circumferentially. The through holes are round holes with a diameter of 3 mm-5 mm or oblong holes with a width of 3 mm-5 mm and a length-width ratio of 1.5-2.5. The through holes can better increase the static friction force between the clothes and the wave wheel surface and the acting force between the clothes and water flow.

The wave wheel in accordance with the present invention can better make the clothes move toward the wave wheel center under the joint action of the impact force of water flow formed by the rotating wave wheel, the friction force and driving force of the projections and the centrifugal force generated by the rotating wave wheel. As the clothes also rotate circumferentially along with the wave wheel, 8 to 12 bumps are evenly arranged, in order to make the clothes further obtain the centripetal force while reducing the angular velocity of the swinging clothes.

The dewatering holes are round holes with a diameter of 1 mm-5 mm or oblong holes with a width of 1 mm-3 mm and a length-width ratio of 2-3.

The diameter ratio of the wave wheel to the inner tub bottom is 0.6-0.8 for the purpose of making the clothes fall to the bottom of the inner tub and slowing down the rotation of the clothes along with the wave wheel, and meanwhile, increasing the buffering for clothes when falling down and entering the wave wheel, thereby continuing the overturning cycle of clothes.

A floating drum for enabling the inner tub to float after water is added is arranged beneath the inner tub, the wave wheel is fixed on a wave wheel shaft, and the other end of the wave wheel shaft is connected to the drive device via the inner tub and the floating drum. An outer clutch gear is arranged on the wave wheel shaft, and the floating drum is provided with an inner clutch gear meshed with the outer clutch gear. When the floating drum drives the inner tub to float, the outer clutch gear disconnects with the inner clutch gear, realizing relative motions between the inner tub and the wave wheel shaft. And when the inner tub falls down by gravity after water is drained, the clothes overturn in a uniform wobble way during the outer clutch gear connecting with the inner clutch gear. Ultimately, the wave wheel and the inner tub are driven to rotate at a high speed for the purpose of dewatering.

The floating drum is of a hollow cyclic structure formed by a plurality of plastic parts, wherein, the cyclic structure consists of an inner ring and an outer ring. The inner ring is connected with the outer ring by radial ribs, and a fan-shaped cavity is formed between ribs, the inner ring forms a bump whose height decreases outwards from the center, and the inner clutch gear is arranged at the top of the inner ring.

A washing method of the washing machine utilizing a uniform washing force is as follows: during washing, under the joint action of centrifugal force of the wave wheel, acting force between the clothes and the wave wheel, acting force between the clothes and water flow, water buoyancy, gravity of the clothes and acting force between the clothes, the clothes move upwards to the wave wheel center while the wave wheel rotating; then the clothes roll outwards layer by layer after reaching the climax of the wave wheel and fall to the bottom of the inner tub along the inner tub wall; specifically, following the swing of the wave wheel, the clothes overturn to a second outer layer from the center in a uniform wobble way at a certain frequency, then overturn to a third outer layer in a uniform wobble way, and overturn outwards layer by layer until reaching the inner tub wall, fall to the bottom of the inner tub along the inner tub wall, and then move to the wave wheel center under the foresaid forces; the washing machine changes the water level, rotating speed and washing time with the change of the clothes load, so that the clothes can overturn repeatedly to complete the washing.

In accordance with the present invention, the clothes roll outwards from the center layer by layer in a uniform wobble way, wherein, the "uniform" means uniform distribution, including the uniform distribution of the clothes when overturning. Specifically, the clothes overturn in a wobble way with the water flow while rotating along with the wave wheel, wherein, the "overturn in a wobble way" comprises the overturn for loosening between the clothes and preventing the clothes from entangling tightly, and the overturn for shaking itself free as well. The wobble frequency is related to the rotating speed of the motor, forward and reverse rotation time and the pause time between the forward and reverse rotation.

The overturning frequency of the clothes is as follows: less than 1 min per overturn when the clothes load is less than 60% of the rated load, 1 min-3 min per overturn when the clothes load is more than 60% of the rated load but less than the full load, and 4 min-5 min per overturn under the full load.

The rotating target speed, acceleration time and uniform rotating time of the wave wheel shall slightly increase with the change of the clothes load, so that the joint force driving the clothes to move towards the wave wheel center is stronger than the force driving the clothes to move along with the wave wheel. The stopping time kept unchanged during the rotation make the clothes keep overturning. The rotating target speed is increased by 10-20 rpm, the acceleration time is increased by 0 ms-10 ms, and the uniform rotating time is increased by 0 ms-100 ms. By controlling the rotating target speed, acceleration time and uniform rotating time of the wave wheel, the clothes roll outwards from the center in a uniform wobble way until reaching the inner tub wall while rotating along with the wave wheel, and then fall down.

The swing angle of the wave wheel during washing is 150°~300°. The swing angle of the wave wheel changes with the clothes load so that the force directions of the clothes match the directions of the overturning trails; specifically, the swing angle of the wave wheel is 150°-200° under a low clothes load, 200°-250° under a medium clothes load and 250°-300° under a heavy clothes load.

The washing method in accordance with the present invention only requires soaking the clothes with washing water without the need of a high water level, and it can realize the high-efficiency washing even if there is no sufficient water for making the clothes float. According to the clothes load, water added is generally higher than the height of the wave wheel center by 80 mm-300 mm.

According to the clothes load, water added is required as follows: the water added is higher than the height of the wave wheel center by 80 mm-150 mm under the low clothes load, higher than the height of the wave wheel center by 150 mm-220 mm under the medium clothes load, and higher than the height of the wave wheel center by 220 mm-300 mm under the heavy clothes load.

Under the low clothes load, the ratio of the water level height to the diameter of the inner tub is 0.2-0.4, the rotating speed is 60-100 rpm, the washing time is 8 min-12 min, and the overturning time of the clothes is 30 s-1 min; under the medium clothes load, the ratio of the water level height to the diameter of the inner tub is 0.3-0.7, the rotating speed is 70-120 rpm, the washing time is 9 min-15 min, and the overturning time of the clothes is 1 min-2 min; under the heavy clothes load, the ratio of the water level height to the diameter of the inner tub is 0.5-0.9, the rotating speed is 80-140 rpm, the washing time is 10 min-25 min, and the overturning time of the clothes is 2 min-5 min.

The low clothes load of the wash machine in accordance with the present invention is 0 kg~2 kg, the medium clothes load is 3 kg~5 kg and the heavy clothes load is 6 kg~8 kg.

The above-mentioned technical scheme of the present invention has the following advantages compared with the prior art:

The washing machine utilizing a uniform washing force in accordance with the present invention achieves diversified moving modes through the action of the wave wheel on the clothes. The clothes move towards the wave wheel center along the wave wheel. As the clothes move to the higher position, the clothes overturn outwards to the bottom of the inner wall under the action of the gravity, centrifugal force and surrounding clothes after reaching the climax of the wave wheel center. The diameter ratio of the wave wheel to the inner tub bottom is 0.6-0.8 for the purpose of making the clothes fall to the bottom of the inner tub and slowing down the rotation of the clothes along with the wave wheel, and meanwhile, increasing the buffering for clothes when falling down and entering the wave wheel, thereby continuing the overturning cycle of clothes. The clothes is subject to the uniform friction during moving in the inner tub, so the evenness of washing is more than 95%, and the cleaning efficiency is more than 0.9, while the cleaning efficiency of the washing machine in prior art is generally 0.7-0.8, and the evenness of washing peaks at 80%. Under certain acting force of the wave wheel, the clothes depend less on water. As a result, the amount of detergent used for the detergent solution of the same concentration is reduced, saving water and detergent and reducing the pollution of sewage. The washing machine can save about 30-50% of water for each wash cycle.

Referring to the accompanying drawings, the embodiments of the present invention are further described:

EMBODIMENT

Figure 1:
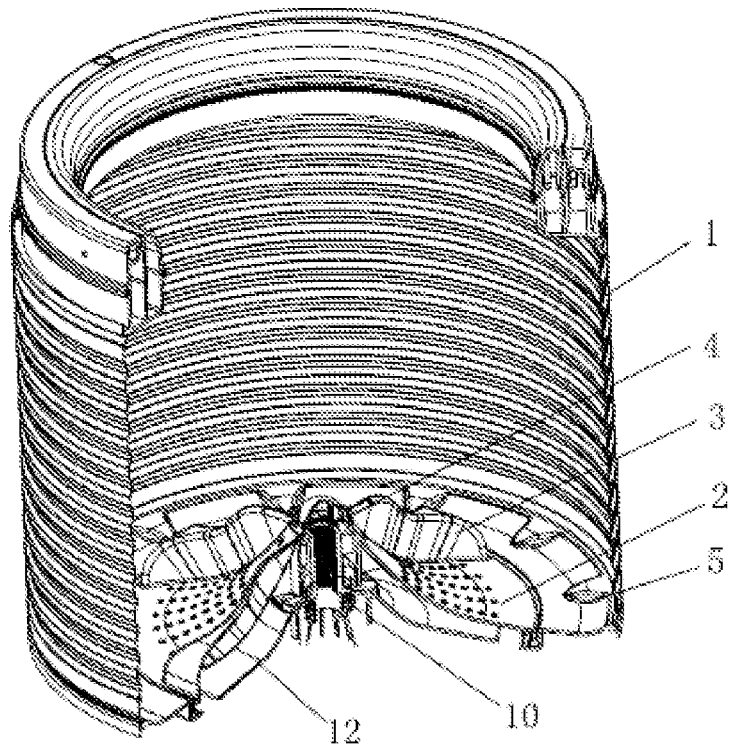
FIG. 1 is a cross-sectional view of the inner tub and the wave wheel of the washing machine in accordance with the present invention.
Figure 2:
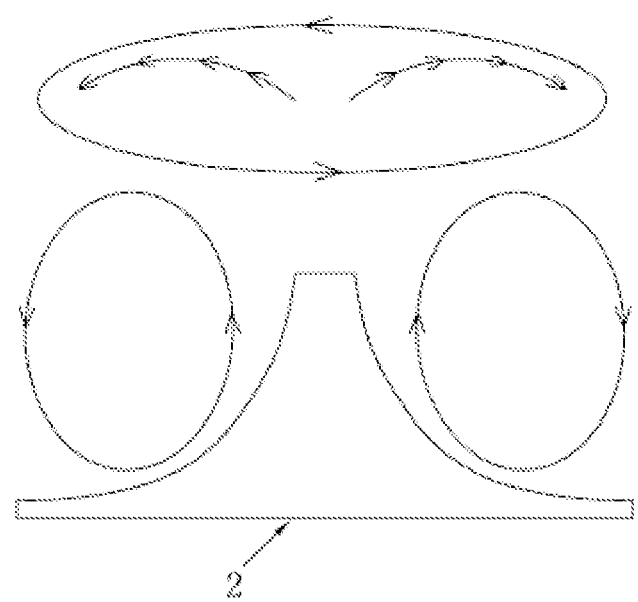
FIG. 2 is a schematic of the overturning trails of the clothes being washed in the washing machine in accordance with the present invention.
Figure 4:
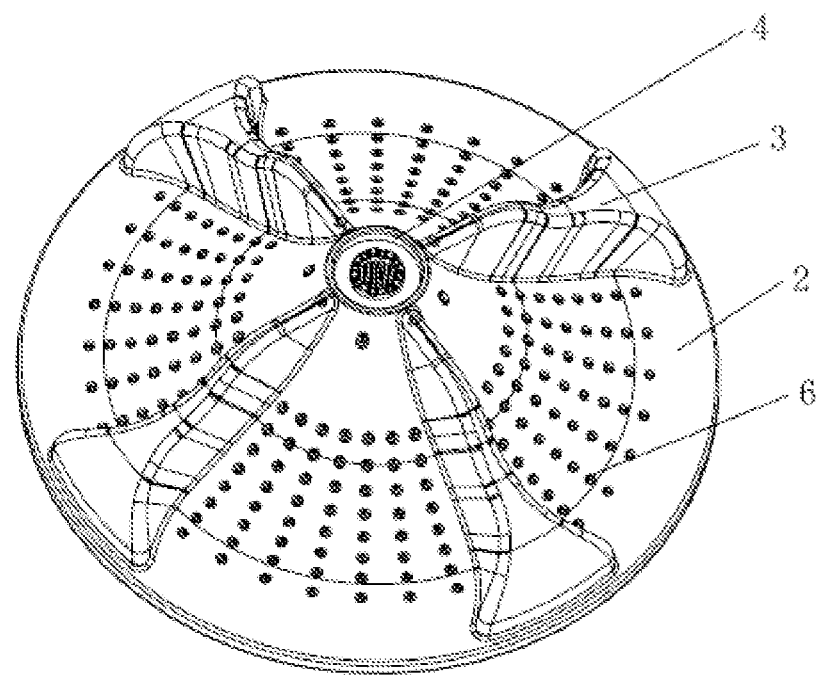
FIG. 4 is a schematic of the wave wheel in accordance with the present invention.

A washing machine in accordance with the present invention comprises an outer tub for containing water, an inner tub 1 arranged in the outer tub for containing clothes, a rotatable wave wheel 2 and a drive device for controlling the rotation of the inner tub and the wave wheel. Referring to FIG. 1, FIG. 2 and FIG. 4, the wave wheel 2 is of a disc-shaped structure gradually rising up towards the center from its edge, and on which a projection 3 for guiding the clothes in moving toward its center is arranged. The clothes move toward the wave wheel center 4, and move upwards along the projection on the wave wheel center, then roll outwards layer by layer and fall to the bottom of the inner tub along the wall of the inner tub. The projection 3 being in echelon is radially arranged from the wave wheel center 4 to the edge. The descending from one echelon to its next one is realized in a way that the circular arcs are tangent to each other, and two adjacent echelons meet in a curved line at a low place around the wave wheel. A distance L between the projection and the edge of the wave wheel is 3 mm-10 mm (referring to FIG. 7). The projection is gradually widened from the center to the edge and from the top surface to the bottom. A plurality of bumps 5 for preventing the clothes from rotating completely along with the wave wheel and thereby changing the motion trails of the clothes are evenly arranged at the junction of the bottom and the circumferential wall of the inner tub, and the diameter ratio of the wave wheel 2 to the inner tub 1 is 0.6-0.8 for the purpose of making the clothes fall to the bottom of the inner tub and slowing down the rotation of the clothes along with the wave wheel, and meanwhile, increasing the buffering for clothes when falling down and entering the wave wheel, thereby continuing the overturning cycle of the clothes. The diameter ratio of the wave wheel to the inner tub in accordance with the present invention is preferably 0.65-0.75.

In accordance with the present invention, three to six projections 3 are provided. Referring to FIG. 4, the projections 3 are gradually widened from the wave wheel center 4 to the edge, and the projections at the edge look like the tail fin of whale. The height of the projections 3 at the wave wheel center 4 is 1/10-1/9 of the diameter of the wave wheel, and the projections occupy 1/5-1/2 of the total area of the wave wheel. The profile formed by the two sides of the projection at the surface of the wave wheel is of a "/\"-shaped structure in radial direction formed by a plurality circular arcs being tangent to each other. The two sides of the projection are slopes transiting smoothly from the surface of the wave wheel, and the inclined angle between the slope and the surface of the wave wheel between two projections is from 90° to 120°, wherein, the inclined angle of the section 1/4 to 2/3 of the length of the projection from the center of the wave wheel is from 110° to 120°. The surface of the wave wheel between two projections is provided with a plurality of holes which are arranged radially and circumferentially evenly, in order to increase the static fiction between the clothes and the surface of the wave wheel, and change the acting force between the clothes and flow. The holes are round holes with a diameter of 3 mm-5 mm, or the holes are oblong holes with a width of 3 mm-5 mm and a length-width ratio of 1.5-2.5.

Figure 7:
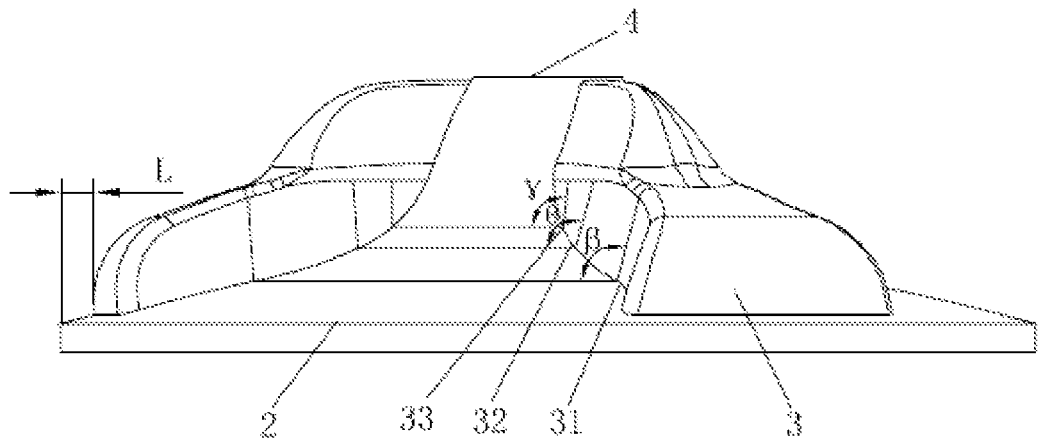
FIG. 7 is a schematic of the projections in accordance with the present invention.

Referring to FIG. 7, the slopes at two sides of the projections comprises outer slopes 31, medium slopes 32 and inner slopes 33 based on their distances from the wave wheel center, wherein, the inclined angles between the outer slopes 31, the inner slopes 33 and the wave wheel surface (β and γ) is from 100° to 110°, and the inclined angle (θ) between the medium slopes 32 and the wave wheel surface is 120°.

The foregoing structure can better make the clothes move toward the wave wheel center under the joint action of the impact force of water flow formed by the rotating wave wheel, the friction force and driving force of the projection itself and the centrifugal force generated by the rotating wave wheel.

Figure 5:
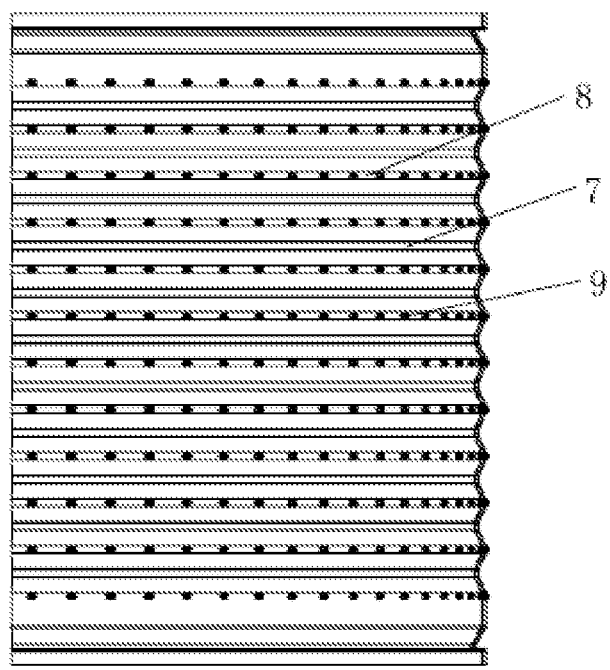
FIG. 5 is a plan view of the circumferential wall of an inner tub in accordance with the present invention.

Referring to FIG. 5, the inner tub 1 is made with stainless steel sheet, and several circles of ring-shaped inward profiled structures 7 are arranged on the circumferential wall of the inner tub, to increase the friction area when the clothes fall down. Outward flangings 8 and round holes 9 or oblong holes are arranged annularly and evenly between two ring-shaped profiled structures. The thickness of the circumferential wall of the inner tub is 0.4 mm-1 mm, the depth of the profiled structure is 1 mm-5 mm and the space between two holes is 10 mm-15 mm. The profiled structure of the inner tub reduces the falling time of the clothes while increasing the friction area, and reduces the possibility that the clothes pile up along the circumferential wall at the tub wall bottom, thus the complete overturning of the clothes can be better achieved.

Figure 6:
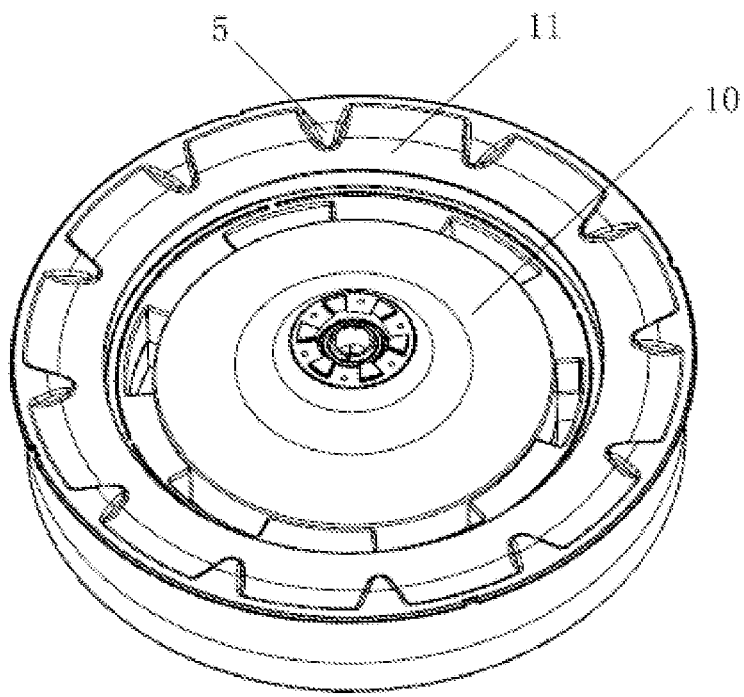
FIG. 6 is a schematic of the inner tub bottom in accordance with the present invention.

Referring to FIG. 6, a groove 10 matched with the wave wheel is arranged at the bottom of the inner tub, and the wave wheel is arranged in the grove 10. The periphery of the groove is an annular area 11, and 3 to 12 bumps 5 are evenly arranged at the junction of the bottom and the circumferential wall of the inner tub in the annular area. The clothes have the rotational speed along with the wave wheel rotating as well. In general, 8 to 12 bumps are evenly arranged, in order to reduce the swing of the clothes along with the wave wheel and generate centripetal force. Thus, the clothes further obtain the centripetal force while reducing the angular velocity of the swinging clothes.

Referring to FIG. 1, a floating drum 12 for enabling the inner tub to float after adding water is arranged beneath the inner tub 1 in accordance with the present invention. The wave wheel 2 is fixed on a wave wheel shaft, and the other end of the wave wheel shaft is connected to the drive device through the inner tub 1 and the floating drum 12. An outer clutch gear is arranged on the wave wheel shaft, and the floating drum 12 is provided with an inner clutch gear 10 meshed with the outer clutch gear. When the floating drum 12 drives the inner tub 1 to float, the outer clutch gear disconnects with the inner clutch gear, thus, the relative motions between the inner tub and the wave wheel shaft are formed. And the inner tub falls down by gravity after water is drained, and the clothes are distributed in a uniform wobble way during the outer clutch gear connecting with the inner clutch gear. Then the wave wheel and the inner tub are driven to rotate together at a high speed for the purpose of dewatering.

The floating drum 12 is of a hollow cyclic structure formed by a plurality of plastic parts, wherein, the cyclic structure consists of an inner ring and an outer ring. The inner ring is connected with the outer ring by radial ribs, and a fan-shaped cavity is formed between ribs. The inner ring forms a bump whose height decreases outwards from the center, and the inner clutch gear is arranged at the top of the inner ring.

Referring to FIG. 2, a washing method of the washing machine utilizing a uniform washing force is as follows: during washing, under the joint action of centrifugal force of the wave wheel, the acting force between the clothes and the wave wheel, the acting force between the clothes and flow, the water buoyancy, the gravity of clothes and the acting force between the clothes, the clothes move upwards to the wave wheel center while the wave wheel rotating; then the clothes roll outwards after reaching the climax and fall to the bottom of the inner tub along the inner tub wall. Specifically, following the swing of the wave wheel, the clothes overturn to a second outer layer from the center in a uniform wobble way at a certain frequency, then overturn to a third outer layer in a uniform wobble way, and overturn outwards layer by layer until reaching the inner tub wall, and fall to the bottom of the inner tub along the inner tub wall, and then move to the wave wheel center under the above mentioned forces. The washing machine changes the water level, rotating speed and washing time with the change of the clothes load, so that the clothes can overturn repeatedly to complete the washing.

According to the washing method described in the present invention, when the clothes reached the climax of the wave wheel center 4, the motion mode of the clothes is that the clothes move upwards following the inertia, then overturn outwards till the clothes reached a position far from the wave wheel center at the circumferential wall of the inner tub 1 under the action of the centrifugal force and clothes at bottom after moving upwards transiently. Then the clothes move to the bottom of the inner tub 1 under the action of a centripetal force generated by the rotating inner tub and the pulling-down force of the subjacent clothes. The motion trails are shown in FIG. 2, during the entire motion, every part of the clothes is under force and moves; the force is not strong but uniform with a relatively high frequency. During washing, the periodic action provides less wear and a better dirt removing effect. The aforesaid motion mode is present under the optimal clothes load and amount of washing water.

Specifically, the aforesaid overturning washing of the clothes is divided into a first half motion cycle and a second half motion cycle. The first half motion cycle is as follows: when the clothes are at the bottom of the inner tub 1 and move far away from the wave wheel center, under the acting force of the flow formed by the rotating wave wheel 2, friction force and driving force of the projections 3, and the centrifugal force generated by the rotating wave wheel 2, the clothes move upwards to the climax of the wave wheel center 4 along the projections 3 while the wave wheel rotating.

The second half motion cycle is as follows: during moving towards the climax of the wave wheel center 4, the clothes are subject to the upward driving force of the subjacent clothes moving upwards and the impact action of flow; when reaching the climax of the wave wheel center 4, the clothes keep moving upwards under the action of the inertia, meanwhile, under the action of gravity of the clothes, the pulling force and torsion of the fallen clothes and the centrifugal force formed by the rotating wave wheel, the clothes overturn outwards till reaching the position far from the wave wheel center at the bottom of the inner tub 1 after moving upwards transiently.

Referring to FIGS. 9-13, the clothes at different positions of the bottom of the inner tub and the wave wheel are subject to different forces. Detailed analysis is as follow.

Figure 9:
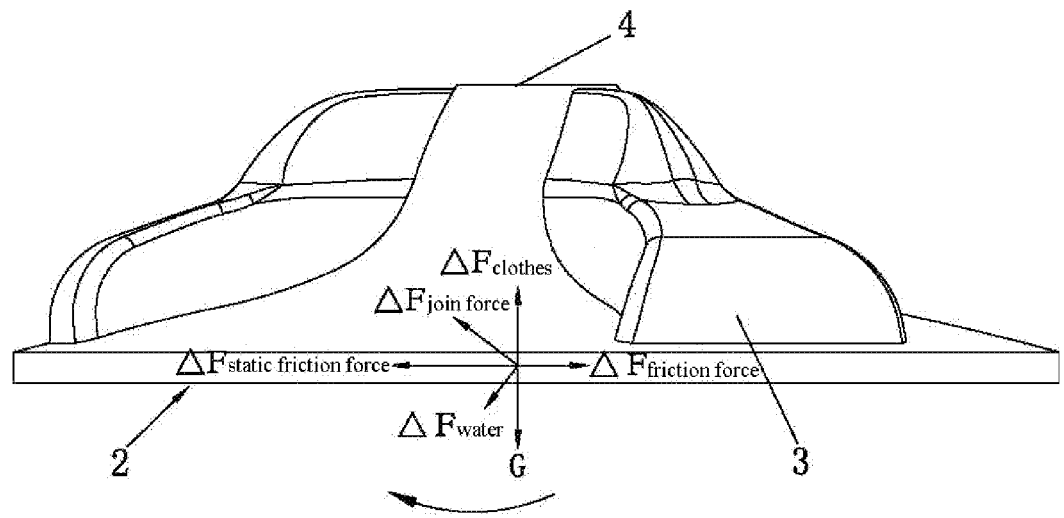
FIG. 9 is a force view of the clothes at the inner tub bottom and outside the wave wheel in the washing method in accordance with the present invention.

A). When the clothes are outside the wave wheel 2 at the bottom of the inner tub 1, the clothes are subject to the static friction force $\Delta F_{static\ friction\ force}$ from the wave wheel 2 for driving the clothes to move along with the wave wheel, the acting force $\Delta F_{clothes}$ from the upper clothes on the wave wheel 2 for driving clothes to move upwards, the flow force $\Delta F_{water}$ from water flow overflowing into space between the wave wheel 2 and the inner tub 1 formed by the rotating wave wheel 2 for driving the clothes to move towards the bottom and edge of the inner tub, the friction force $\Delta F_{friction\ force}$ between the clothes and the inner tub for preventing the clothes from moving, and the combined gravity G of the clothes and the clothes at a higher vertical height. Buoyancy $\Delta F_{buoyancy}$ has a tiny influence on the motion of the clothes and can be ignored. Referring to FIG. 9, the force on the clothes shall satisfy the following formula when the wave wheel rotates clockwise.

$$\Delta F_{join\ force} = \Delta F_{friction\ force} + \Delta F_{static\ friction\ force} + \Delta F_{water} + \Delta F_{clothes} + G$$

The motion trails of clothes are that the clothes move upwards along the wave wheel 2 along with the wave wheel 2 rotating.

B). When the clothes are in space between two projections 3, the force is that:

$$\Delta F_{join\ force} = \Delta F_{friction\ force} + \Delta F_{centrifugal\ force} + \Delta F_{driving\ force} + \Delta F_{static\ friction\ force} + \Delta F_{water} + \Delta F_{clothes} + G + \Delta F_{buoyancy}$$

Figure 10:
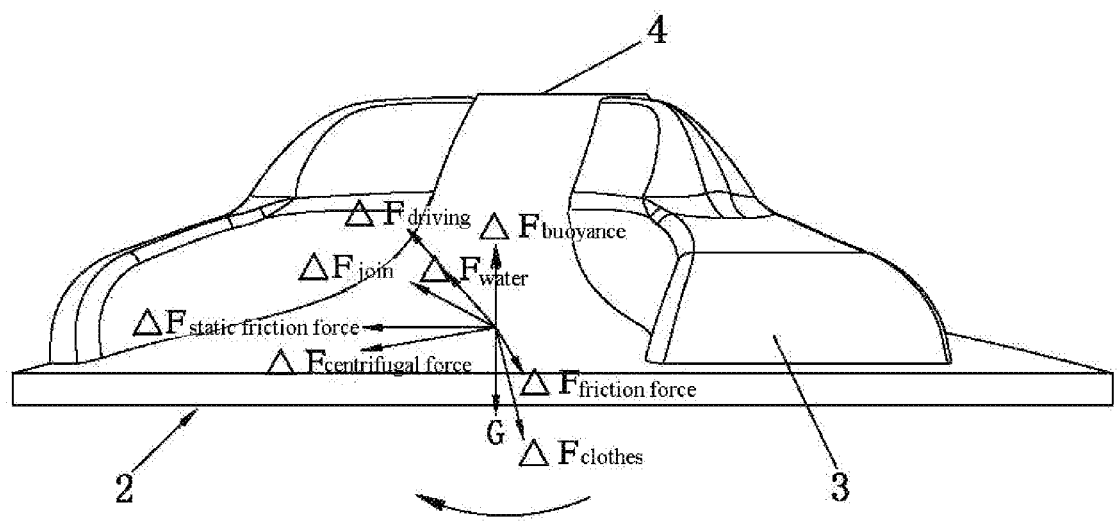
FIG. 10 is a force view of the clothes between two projections in the washing method in accordance with the present invention.

Wherein:

$\Delta F_{friction\ force}$ refers to the friction force from the clothes at a relatively low vertical height. $\Delta F_{centrifugal\ force}$ refers to the centrifugal force formed by the rotating wave wheel 2. $\Delta F_{driving\ force}$ refers to the driving force on the clothes from the projections 3. $\Delta F_{static\ friction\ force}$ refers to the static friction force on the clothes during the wave wheel 2 starting. $\Delta F_{water}$ refers to the acting force of the flow driven by the wave wheel 2. $\Delta F_{clothes}$ refers to the torsion and resistance from clothes at a relatively high vertical height. G refers to the gravity of the clothes and the clothes at a higher vertical height. During washing, the wave wheel 2 repeats stopping and starting, the static friction force from the wave wheel 2 keeps on influencing on the clothes, making them move upwards. The force on the clothes is shown in FIG. 10, and the wave wheel rotates clockwise.

C). When the clothes move upwards and towards the center along the projections 3, the force is that:

$$\Delta F_{join\ force} = \Delta F_{friction\ force} + \Delta F_{static\ friction\ force} + \Delta F_{water} + \Delta F_{clothes} + G + \Delta F_{centrifugal\ force} + \Delta F_{driving\ force} + \Delta F_{wave\ wheel\ blade}$$

Figure 11:
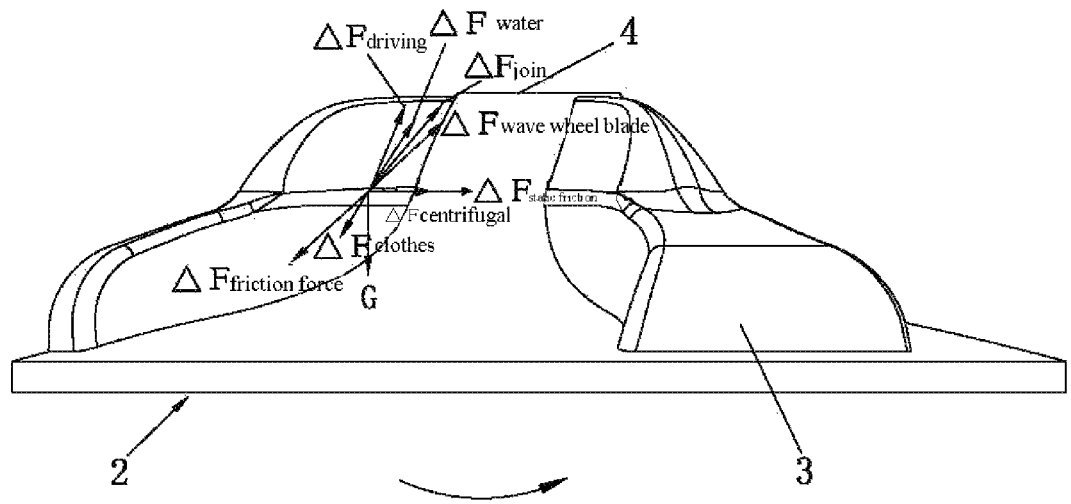
FIG. 11 is a force view of the clothes which move upward to the center of the wave wheel along the projections in the washing method in accordance with the present invention.

Wherein:

$\Delta F_{friction\ force}$ refers to the friction force from the surrounding clothes during moving upwards. G refers to the combined gravity of the clothes itself and the clothes at a higher vertical height pressing on it. During this process, the upward driving force $\Delta F_{driving\ force}$ is from the subjacent clothes, and $\Delta F_{static\ friction\ force}$ refers to the static friction force during the wave wheel 2 starting. $\Delta F_{water}$ refers to the acting force of the flow. $\Delta F_{clothes}$ refers to the torsion and resistance from the clothes at a relatively high vertical height. $\Delta F_{centrifugal\ force}$ refers to the centrifugal force formed by the rotating wave wheel. And $\Delta F_{wave\ wheel\ blade}$ refers to the driving force from the projections. The clothes move upwards under these forces. The force on the clothes is shown in FIG. 11, and the wave wheel rotates counter-clockwise.

D). When the clothes move towards the climax of the wave wheel center 4 along the projections 3, the force is that:

$$\Delta F_{join} = \Delta F_{friction\ force} + G + \Delta F_{driving\ force} + \Delta F_{centrifugal\ force} + \Delta F_{clothes} + \Delta F_{water}$$

Figure 12:
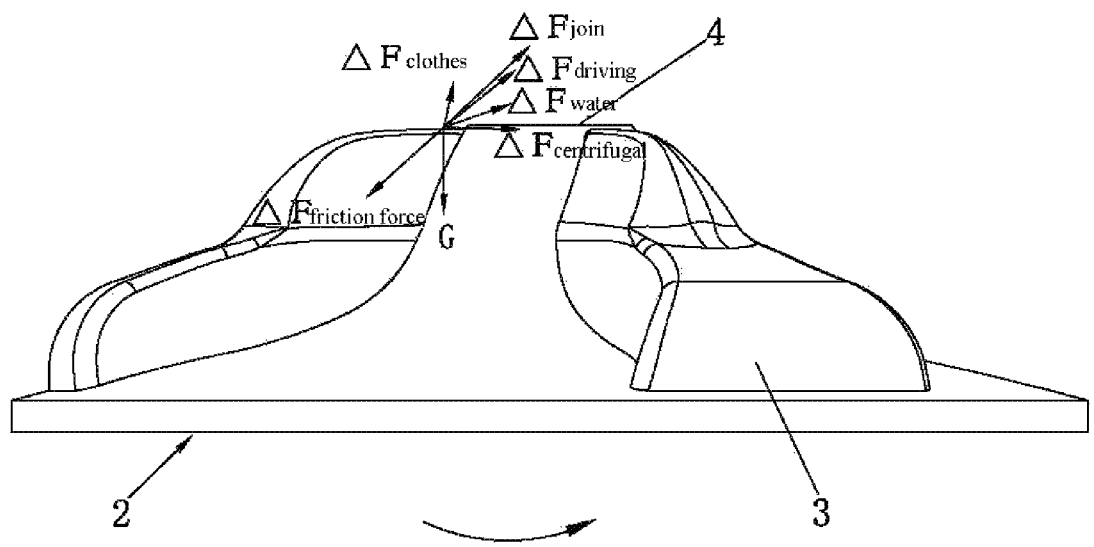
FIG. 12 is a force view of the clothes which move to the climax of the wave wheel center along the projections in the washing method in accordance with the present invention.

Wherein:

$\Delta F_{friction\ force}$ refers to the friction force on clothes from the wave wheel 2. As the clothes are going to disconnect with the wave wheel 2, the friction force is tiny. The clothes are mainly driven by the upward driving force $\Delta F_{clothes}$ from the subjacent clothes, $\Delta F_{centrifugal\ force}$ formed by the rotating wave wheel and the driving force $\Delta F_{driving\ force}$ from the projections. $\Delta F_{water}$ refers to the impact of water flow. The clothes keep the motion trend till disconnecting with the wave wheel 2; the clothes disconnect with the wave wheel when reaching the climax. Under the gravity, the clothes have a transitory motion similar to projectile motion; due to the driving force and pulling force between the clothes, when the clothes in the outer layer just overturn outwards but haven't contacted the inner tub wall, some other clothes overturn outwards from the center under force, and drive the clothes in the outer lay to keep moving outwards. In this way, the clothes roll outwards from the center layer by layer; the outmost layer reaches the inner tub wall far from the wave wheel center under the acting force of the clothes and the centrifugal force formed by the rotating wave wheel. Force on the clothes is shown in FIG. 12, and the wave wheel rotates counter-clockwise.

Figure 13:
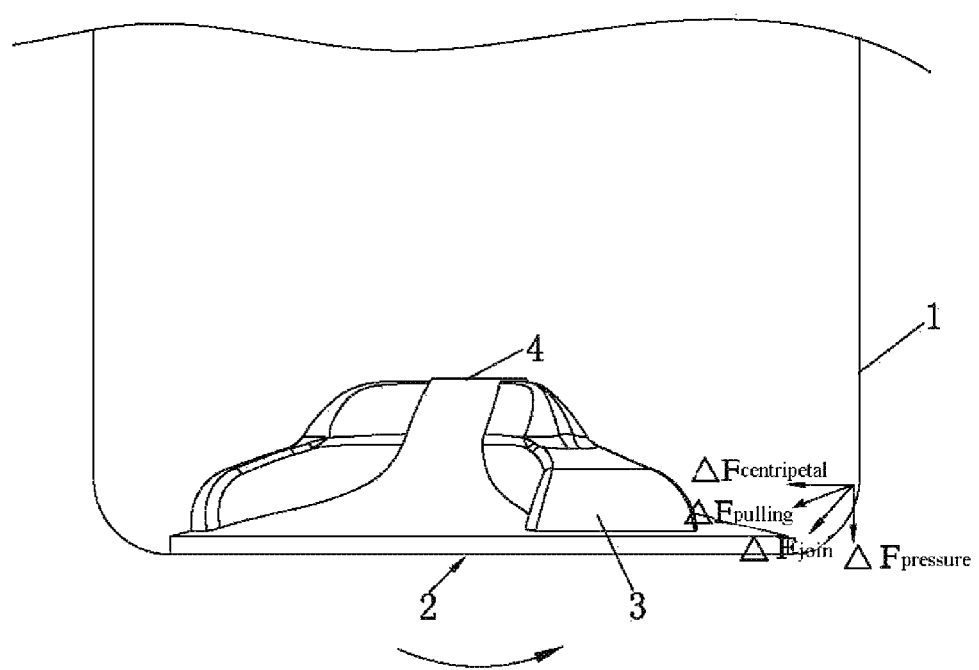
FIG. 13 is a force view of the clothes which fall downward along the chamfer at the bottom of the inner tub in the washing method in accordance with the present invention.

E). After falling, the clothes move downward along the chamfer at the bottom of the inner tub 1. Under the slantingly downward join force $\Delta F_{join\ force}$ consisting of the pulling force $\Delta F_{pulling\ force}$ from the clothes at a lower vertical height, pressure $\Delta F_{pressure}$ from the clothes at a higher vertical height and centripetal force $\Delta F_{centripetal\ force}$ formed by the rotating inner tub, the clothes move downward until reaching the bottom of the inner tub 1. Force on the clothes is shown in FIG. 13, and the wave wheel rotates counter-clockwise.

Through the description of the above-mentioned A-E five processes, a complete motion trail of the clothes can be drawn as shown FIG. 2.

Figure 3:
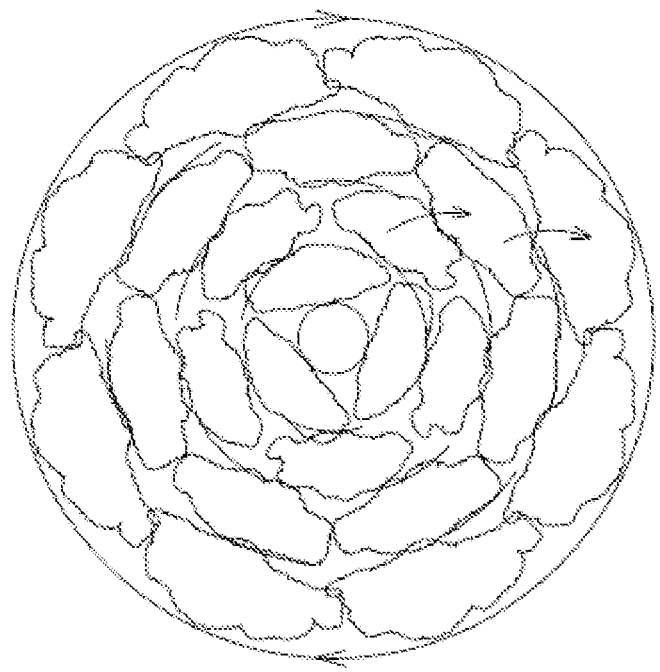
FIG. 3 is a schematic view illustrating the uniform overturning state of the clothes being washed in the washing machine in accordance with the present invention.

Referring to FIG. 3, the clothes overturn in a wobble way with the water flow while rotating along with the wave wheel, wherein, the "overturn in a wobble way" comprises the overturn for loosening each piece of clothes and preventing the clothes from entangling tightly, and the overturn for shaking itself free as well. The wobble frequency is related to the rotating speed of the motor, forward and reverse rotation time and the pause time between the forward and reverse rotation. The certain frequency is as follows: less than 1 min per overturn when the clothes load is less than 60% of the rated load, and 1 min-3 min per overturn when the clothes load is more than 60% of the rated load but less than the full load, and 4 min-5 min per overturn under the full load. During the overturning, the clothes are uniformly distributed, ensuring that any parts of the clothes can rub with other clothes or the wave wheel or the inner tub, and thereby improving the cleaning efficiency.

The swing angle of the wave wheel is 150°-200° under a low clothes load, 200°-250° under a medium clothes load and 250°-300° under a heavy clothes load. The clothes can roll outwards from the center layer by layer in a wobble way only by the aforesaid setting different swing angles according to changes of the clothes load.

Another factor that can be added is as follows: the rotating target speed, acceleration time and uniform rotating time of the wave wheel shall slightly increase with the change of the low clothes load, the medium clothes load and the heavy clothes load, so that the joint force driving the clothes to move towards the wave wheel center is stronger than the force driving the clothes to move along with the wave wheel. The stopping time kept unchanged during the rotation makes the clothes keep overturning. The rotating target speed is increased by 10-20 rpm, the acceleration time is increased by 0 ms-10 ms, and the uniform rotating time is increased by 0 ms-100 ms.

Specifically, the rotating target speed of the wave wheel is 60-100 rpm, the acceleration time is 100 ms-350 ms and the uniform rotating time is 200 ms-800 ms under the low clothes load; the rotating target speed of the wave wheel is 70-120 rpm, the acceleration time is 110 ms-350 ms and the uniform rotating time is 300 ms-800 ms under the medium clothes load; the rotating target speed of the wave wheel is 80-140 rpm, the acceleration time is 120 ms-350 ms and the uniform rotating time is 400 ms-800 ms under the heavy clothes load. The stopping time under all kinds of loads is 0 ms-1000 ms, as shown in the following table:

| Load grade | Cloth weight (unit: kg) | Target speed RPM | Acceleration time (Unit: ms) | Uniform rotating time (unit: 10 ms) | Stopping time (unit: 10 sms) |
|---|---|---|---|---|---|
| Low load | 0 | 60~100 | 100~350 | 20~80 | 0~100 |
|  | 1 | 60~100 | 100~350 | 20~80 | 0~100 |
|  | 2 | 60~100 | 100~350 | 20~80 | 0~100 |
| Medium load | 3 | 70~120 | 110~350 | 30~80 | 0~100 |
|  | 4 | 70~120 | 110~350 | 30~80 | 0~100 |
|  | 5 | 70~120 | 110~350 | 30~80 | 0~100 |
| Heavy load | 6 | 80~140 | 120~350 | 40~80 | 0~100 |
|  | 7 | 80~140 | 120~350 | 40~80 | 0~100 |
|  | 8 | 80~140 | 120~350 | 40~80 | 0~100 |

Under the low clothes load, the ratio of the water level height to the diameter of the inner tub is 0.2-0.4, the rotating speed is 60-100 rpm, the washing time is 8 min-12 min, and the overturning time of the clothes is 30 s-1 min; under the medium clothes load, the ratio of the water level height to the diameter of the inner tub is 0.3-0.7, the rotating speed is 70-120 rpm, the washing time is 9 min-15 min, and the overturning time of the clothes is 1 min-2 min; under the heavy clothes load, the ratio of the water level height to the diameter of the inner tub is 0.5-0.9, the rotating speed is 80-140 rpm, the washing time is 10 min-25 min, and the overturning time of the clothes is 2 min-5 min, as shown in the following table.

| Load grade | Load weight kg | Scope of the ratio of the water level height to the diameter of the inner tub | Overturning time of clothes | Washing time | Rinsing time |
|---|---|---|---|---|---|
| Low load | 0 | 0.2~0.4 | 30 s | 8~12 min | 2 min~4 min |
|  | 1 |  |  |  |  |
|  | 2 |  |  |  |  |
| Medium load | 3 | 0.3~0.7 | 1 min~2 min | 9 min~15 min | 2 min~5 min |
|  | 4 |  |  |  |  |
|  | 5 |  |  |  |  |
| Heavy load | 6 | 0.5~0.9 | 2 min~5 min | 10 min~25 min | 2 min~5 min |
|  | 7 |  |  |  |  |

The washing method in accordance with the present invention only requires soaking the clothes with washing water without the need of a high water level, and it can realize the high-efficiency washing even if there is no sufficient water for making the clothes float. According to the clothes load, in general, as the clothes load is increased by 1 kg, the increased height difference $h_1$ of the clothes mixing with water satisfies the formula below in order to ensure that the clothes are in contact with the wave wheel while not completely floating. The formula is $h_1=(\pi D^2 h-4V_1)/(K\pi D^2)$, wherein D is the diameter of the inner tub, h is the height of the wave wheel, $V_1$ is the volume of the wave wheel, and K is the optimal clothes load between the wave wheel and the inner tub within the height scope of the wave wheel.

Figure 8:
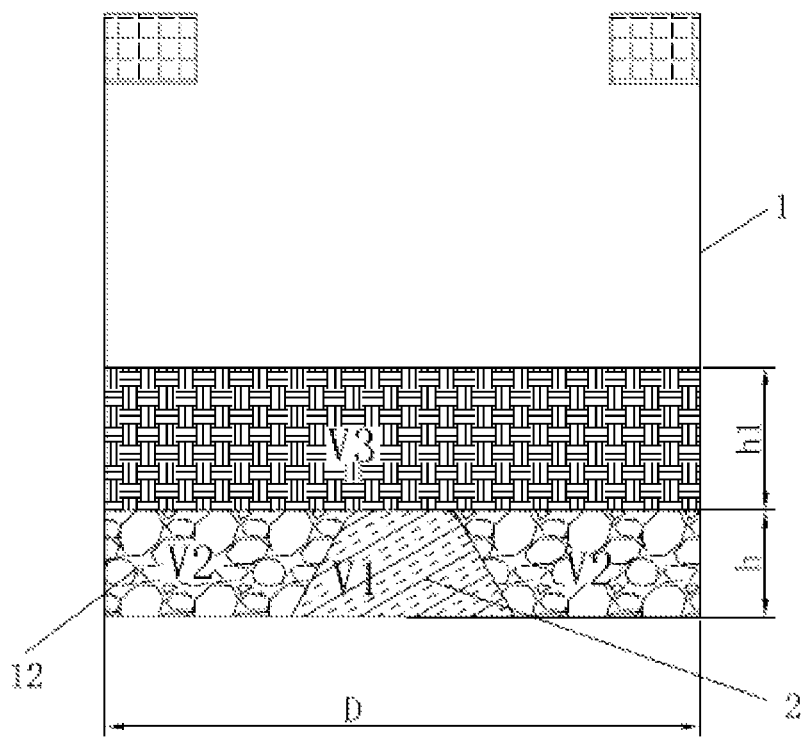
FIG. 8 is a schematic illustrating the relations between the clothes load and the water level in a washing machine in accordance with the present invention.

FIG. 8 shows the schematic view of the inner tub and the wave wheel. The diameter of the inner tub D is 472 mm, the height of the wave wheel h is 98 mm, the volume of the wave wheel $V_1$ is 3020760 mm$^3$, the volume between the wave wheel and the inner tub is $V_2$, the increased volume of the clothes mixing with water is $V_3$ when increasing by 1 kg load, and the increased height difference of the clothes mixing with water is $h_1$ when increasing by 1 kg clothes load, so the following can be obtained:

$$V_2=\pi(D/2)^2=3.14\times(472/2)\times(472/2)\times 98-302070=16836703 \text{ mm}^3$$

The optimal load in $V_2$ is 2 kg, so it can be obtained that the optimal capacity $V_3$ after 1 kg load mixing with water is: $V_3=V_2/2=8418351 \text{ mm}^3$ The corresponding water level height on the top of the wave wheel is $h_1=4\times V_3/(3.14\times 472\times 472)=4\times 8418351/(3.14\times 472\times 472)=48.14$ mm, that is, on the top of the wave wheel, as 1 kg clothes load is added, the height of the clothes mixing with water is correspondingly increased by 48.14 mm on average.

Specifically, water added shall be higher than the height of the wave wheel center by 80 mm-150 mm under the low clothes load, by 150 mm-220 mm under the medium clothes load, and by 220 mm-300 mm under the heavy clothes load. The washing method can better save the washing water under any clothes load. The ratio of water level height of 1 kg clothes load to the diameter of the inner tub is shown in the following table:

Relation between the load and water level

| Load level | Load (Unit: kg) | Water level height from the upper part of the inner tub bottom (unit: mm) | Water consumption (Unit: L) | Unit water consumption (unit: L/kg) | Ratio of water level height to the diameter of the inner tub | Ratio of water level height/diameter of the inner tub |
|---|---|---|---|---|---|---|
| Low load | 0 | 100 | 28 | 28.00 | 0.21 | 0.2~0.4 |
|  | 1 | 100 | 28 | 28.00 | 0.21 |  |
|  | 2 | 130 | 35 | 17.50 | 0.28 |  |
| Medium load | 3 | 150 | 40 | 13.33 | 0.32 | 0.3~0.6 |
|  | 4 | 180 | 46 | 11.50 | 0.38 |  |
|  | 5 | 220 | 55 | 11.00 | 0.47 |  |
| Heavy load | 6 | 250 | 64 | 10.67 | 0.53 | 0.5~0.75 |
|  | 7 | 280 | 70 | 10.00 | 0.59 |  |
|  | 8 | 300 | 76 | 9.50 | 0.64 |  |

Before the washing ends, the clothes distribute uniformly through cross water flows, while reducing entanglement of the clothes to recover fibers of the clothes. Thus it can be realized to be a high cleaning efficiency, high evenness, low water consumption and low wear. The cross water flows refer to the multi-strengths of the water flows in a same washing mode. Strengths of water flows are as follows: strengths A-I are different washing strength modes such as standard washing and fast washing set based on clothes being washed such as jeans or silk clothes.

| Water flow strength | Acceleration RPM | Target speed RPM | Uniform rotating time (unit: 10 ms) | Stopping time (unit: 10 ms) |
|---|---|---|---|---|
| A | 260 | 130 | 50 | 0 |
| B | 260 | 120 | 50 | 0 |
| C | 260 | 110 | 50 | 0 |
| D | 210 | 110 | 40 | 0 |
| E | 260 | 100 | 50 | 0 |
| F | 260 | 90 | 50 | 0 |
| G | 260 | 90 | 40 | 0 |
| H | 260 | 80 | 40 | 0 |
| K | 260 | 80 | 30 | 0 |
| I | 260 | 80 | 70 | 10 |

The driving device in accordance with the present invention is a direct drive motor. It can be achieved to wash overall and uniformly without entanglement by virtue of the strong torsion and special motion trail of the direct drive motor together with the water flow imitating hand washing, and greatly improve the cleaning efficiency, as shown in the following table:

| Load | Target speed rpm | Rotating-stopping ratio (water flow strength) | Water/cloth ratio | Overturning time | Washing time |
|---|---|---|---|---|---|
| Low | 70-90 | Water flow is as follows in standard mode at a high water level, 260, 100, 50, 0 Kneading washing 210, 110, 40, 0 Tapping, making clothes loosely contacted 260, 120, 50, 0 Strongly rub, overturn | 1. During washing, the added water about 10 L/kg (cotton cloth) makes clothes tightly press on the wave wheel and guarantees a relatively good overturning effect; 2. Water level 1 shall be higher than the climax of the wave wheel by about 20 mm. This can prevent washing partially under a low load (lower than 2 kg); 3. Water is automatically added in specific modes during washing, increasing the water level along with the changes of the detergent concentration in different washing stages to guarantee a uniform load distribution and smooth dehydration; | 30 s | 8-10 min |
| Medium | 90-110 |  |  | 1~2 min | 9-12 min |
| Heavy | 100-120 |  |  | 2-5 min | 10-15 min |

During washing by the washing machine utilizing a uniform washing force in accordance with the present invention, the clothes move towards the wave wheel center along the wave wheel. As the clothes move to the higher position, the clothes overturn outwards to the bottom of the inner wall under the action of the gravity, centrifugal force and surrounding clothes. The diameter ratio of the wave wheel to the inner tub is 0.6-0.8 for the purpose of making the clothes fall to the bottom of the inner tub and slowing down the rotating speed of the clothes along with the wave wheel, and meanwhile, increasing the buffering for clothes when falling down and entering the wave wheel, thereby continuing the overturning cycle of the clothes. During floating upward before washing, the inner tub realizes the wobble and uniform distribution of the clothes due to changes of the rotating speed of the wave wheel. And during washing, the inner tub wobbles at a frequency based on the corresponding changes of the rotating speed of wave wheel to make the clothes roll outwards from the center through wobble layer by layer under the action of joint force of the clothes. The clothes is subject to the uniform friction during moving in the inner tub, so the evenness of washing is more than 95%, and the cleaning efficiency is more than 0.9. In prior arts, the cleaning efficiency of the washing machine is generally 0.7-0.8, and the highest evenness of washing is 80%. Since the wave wheel acts on the clothes, the clothes depend less on water. As a result, the amount of detergent used for the detergent solution of the same concentration is reduced, saving water and detergent, and reducing the pollution of sewage. The washing machine can save about 30-50% of water for each washing cycle.

The invention claimed is:

1. A pulsator-type washing machine utilizing a uniform washing force comprising:

an outer tub for containing water, an inner tub arranged in the outer tub for containing clothes, a rotatable wave wheel, and a drive device for controlling the rotation of the inner tub and the wave wheel, wherein:

the wave wheel is a disc-shaped structure gradually rising up towards the center from its edge, on which a projection for guiding the clothes to the center is arranged, so that the clothes move upwards on the wave wheel center along the projection, and the projection is arranged outwards from the wave wheel center in echelon, the descent from one echelon to its next one being realized in a way that circular arcs are tangent to each other, and the projection is gradually widened from the wave wheel center to the wave wheel edge and from the top surface of the projection to the bottom of the projection;

two sides of the projection are formed as slopes transitioning smoothly from a surface of the wave wheel, each slope comprising an inner slope, a medium slope and an outer slope, the inner slope being closer to the wave wheel center than the medium slope, and the medium slope being closer to the wave wheel center than the outer slope, the medium slope being a section located at ¼ to ⅔ of the length of the projection measured from the wave wheel center, wherein: (i) an inclined angle between the inner slope and the surface of the wave wheel is greater than or equal to 100° and less than or equal to 110°, (ii) an inclined angle between the medium slope and the surface of the wave wheel is greater than 110° and less than or equal to 120°, and (iii) an inclined angle between the outer slope and the surface of the wave wheel is greater than or equal to 100° and less than or equal to 110°;

the inner tub has a circumferential wall provided with a plurality of ring-shaped inward profiled structures, to increase the friction area when the clothes fall down along the inner tub wall, and outward flanges and dewatering holes annularly and evenly arranged between two ring-shaped profiled structures;

a plurality of bumps for changing motion trails of the clothes are evenly arranged at the junction of the bottom and the circumferential wall of the inner tub;

the inner tub wall and the wave wheel of the washing machine satisfy the following conditions: water in the washing machine soaks the clothes and makes the clothes float while still keeping in touch with the upper surface of the wave wheel; as every 1 kg load is increased, the increased height difference $h_1$ of the clothes mixing with water satisfies the following formula to ensure that the clothes are in contact with the wave wheel while floating: $h_1=(\pi D^2 h - 4V_1)/(K\pi D^2)$, wherein D is the diameter of the inner tub, h is the height of the wave wheel, $V_1$ is the volume of the wave wheel, and K is the optimal clothes load between the wave wheel and the inner tub within the scope of the wave wheel height;

the height of the projection is 1/10-1/5 of the diameter of the wave wheel, and the projection is one of one or more projections that occupy 1/5-½ of the total area of the wave wheel; and the diameter ratio of the wave wheel to the inner tub bottom is 0.6-0.8.

2. The pulsator-type washing machine utilizing a uniform washing force according to claim 1, wherein, the dewatering holes are round holes with a diameter of 1 mm-5 mm or oblong holes with a width of 1 mm-3 mm and a length-width ratio of 2-3.

3. The pulsator-type washing machine utilizing a uniform washing force according to claim 1, wherein, a floating drum for making the inner tub float after water is added is arranged beneath the inner tub, the wave wheel is fixed on one end of a wave wheel shaft, and the other end of the wave wheel shaft is connected to the drive device via the inner tub and the floating drum, an outer clutch gear is arranged on the wave wheel shaft, and the floating drum is provided with an inner clutch gear for meshing with the outer clutch gear, when the floating drum drives the inner tub to float, the outer clutch gear disconnects with the inner clutch gear, realizing relative motions between the inner tub and the wave wheel shaft, and when the inner tub falls down by gravity after water is drained, the outer clutch gear connects with the inner clutch gear, making the clothes overturn in a uniform wobble way, ultimately, the wave wheel and the inner tub are driven to rotate at a high speed for the purpose of dewatering.

4. The pulsator-type washing machine utilizing a uniform washing force according to claim 3, wherein, the floating drum is of a hollow cyclic structure formed by a plurality of plastic parts, and the cyclic structure comprises an inner ring and an outer ring, the inner ring is connected with the outer ring by radial ribs between which a chamber is formed;

the inner ring forms a bump whose height decreases outwards from the center, and the inner clutch gear is arranged at the top of the inner ring.

5. A washing method of the washing machine utilizing a uniform washing force according to claim 1, wherein: during washing, under the joint action of centrifugal force of the wave wheel, acting force between the clothes and the wave wheel, acting force between the clothes and water flow, water buoyancy, gravity of clothes and acting force between the clothes, the clothes move upwards to the wave wheel center while the wave wheel is rotating;

then the clothes roll outwards layer by layer after reaching the climax of the wave wheel and fall to the bottom of the inner tub along the inner tub wall;

specifically, following the swing of the wave wheel, the clothes overturn to a second outer layer from the center in a uniform wobble way at a certain frequency, then overturn to a third outer layer in a uniform wobble way, and overturn outwards layer by layer until reaching the inner tub wall, fall to the bottom of the inner tub along the inner tub wall, and then move to the wave wheel center under the foresaid forces;

and the washing machine changes a water level, rotating speed and washing time with the change of the clothes load, so that the clothes overturn repeatedly to complete the washing.

6. The washing method according to claim 5, wherein, the overturning frequency of the clothes is as follows: less than 1 min per overturn when the clothes load is less than 60% of the rated load, 1 min-3 min per overturn when the clothes load is more than 60% of the rated load but less than the full load, and 4 min-5 min per overturn under the full load.

7. The washing method according to claim 5, wherein, a rotating target speed, acceleration time and uniform rotating time of the wave wheel shall slightly increase with the change of the clothes load, so that the joint force driving the clothes to move towards the wave wheel center is stronger than the force driving the clothes to move along with the wave wheel;

a stopping time unchanged during rotating makes the clothes keep overturning, and the target speed is increased by 10-20 rpm, the acceleration time is increased by 0 ms-10 ms, and the uniform rotating time is increased by 0 ms-100 ms.

8. The washing method according to claim 5, wherein, a swing angle of the wave wheel changes with the clothes load so that the force directions of the clothes match the direction of the overturning trails; specifically, the swing angle of the wave wheel is 150°-200° under a low clothes load, 200°-250° under a medium clothes load and 250°-300° under a heavy clothes load.

9. The washing method according to claim 5, wherein, according to the clothes load, water added is required as follows: water added is higher than the height of the wave wheel center by 80 mm-150 mm under a low clothes load, higher than the height of the wave wheel center by 150 mm-220 mm under a medium clothes load, and higher than the height of the wave wheel center by 220 mm-300 mm under a heavy clothes load.

10. The washing method according to claim 5, wherein, under a low clothes load, the ratio of the water level height to the diameter of the inner tub is 0.2-0.4, the rotating speed is 60-100 rpm, the washing time is 8 min-12 min, and overturning time of the clothes is 30 s-1 min;

under a medium clothes load, the ratio of the water level height to the diameter of the inner tub is 0.3-0.7, the rotating speed is 70-120 rpm, the washing time is 9 min-15 min, and overturning time of the clothes is 1 min-2 min;

under a heavy clothes load, the ratio of the water level height to the diameter of the inner tub is 0.5-0.9, the rotating speed is 80-140 rpm, the washing time is 10 min-25 min, and the overturning time of the clothes is 2 min-5 min.

11. The washing method according to claim 8, wherein, the low clothes load of the washing machine is 0 kg~2 kg, the medium clothes load is 3 kg~5 kg and the heavy clothes load is 6 kg~8 kg.

12. The washing method according to claim 9, wherein, the low clothes load of the washing machine is 0 kg~2 kg, the medium clothes load is 3 kg~5 kg and the heavy clothes load is 6 kg~8 kg.

13. The washing method according to claim 10, wherein, the low clothes load of the washing machine is 0 kg~2 kg, the medium clothes load is 3 kg~5 kg and the heavy clothes load is 6 kg~8 kg.

* * * * *